(12) United States Patent
Park

(10) Patent No.: US 7,180,680 B2
(45) Date of Patent: Feb. 20, 2007

(54) HIGH MAGNIFICATION ZOOM LENS SYSTEM

(75) Inventor: Young-woo Park, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 131 days.

(21) Appl. No.: 11/015,704

(22) Filed: Dec. 17, 2004

(65) Prior Publication Data
US 2005/0237626 A1  Oct. 27, 2005

(30) Foreign Application Priority Data
Apr. 23, 2004  (KR) .................. 10-2004-0028161

(51) Int. Cl.
*G02B 15/14* (2006.01)
(52) U.S. Cl. ..................... 359/683; 359/676
(58) Field of Classification Search ............. 359/676, 359/683
See application file for complete search history.

(56) References Cited

U.S. PATENT DOCUMENTS 4,501,475 A * 2/1985 Fujita et al. .............. 359/683
6,483,648 B1 * 11/2002 Yamanashi ................ 359/683
6,721,105 B2 * 4/2004 Ohtake et al. ............. 359/676

FOREIGN PATENT DOCUMENTS

| JP | 2002-156581 A | 5/2002 |
|----|---------------|--------|
| JP | 2002-365548 A | 12/2002 |
| JP | 2003-177316 A | 6/2003 |

\* cited by examiner

*Primary Examiner*—Scott J. Sugarman
(74) *Attorney, Agent, or Firm*—Gardner Carton & Douglas LLP

(57) ABSTRACT

A high magnification zoom lens is provided. The zoom lens includes a first lens group including a single positive lens and having a positive refractive power, a second lens group having a negative refractive power, a third lens group having the positive refractive power, a fourth lens group having the positive refractive power, and a fifth lens group having the positive refractive power. The first through fifth lens groups are sequentially arranged from an object side toward an image side. The first lens group, the second lens group, and the third lens group are moved in a direction of an optical axis to change magnification. The fourth lens group is moved to compensate for a movement of a focal position occurring during the magnification change, and the fifth lens group is fixed. Accordingly, the zoom lens is compact, has high magnification, and satisfies conditions of a long back focal length and telecentricity that are required when a solid image pickup device is used.

38 Claims, 14 Drawing Sheets

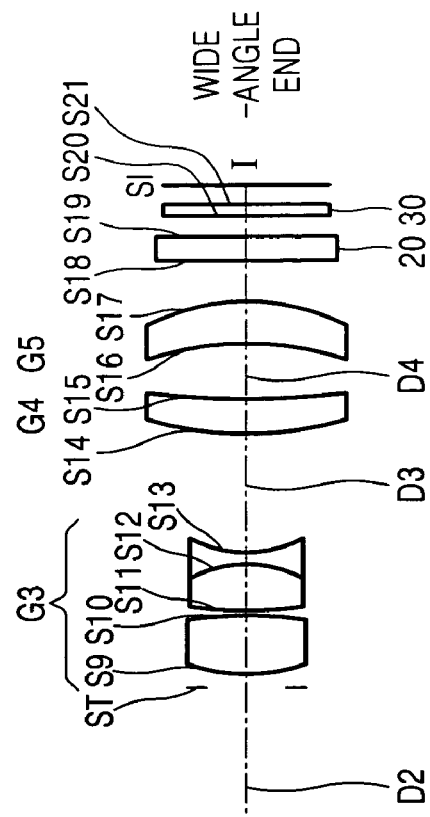
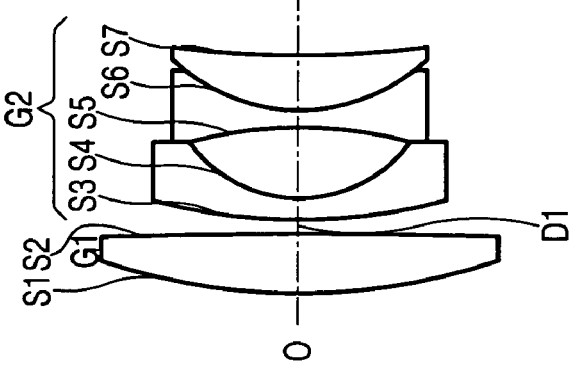
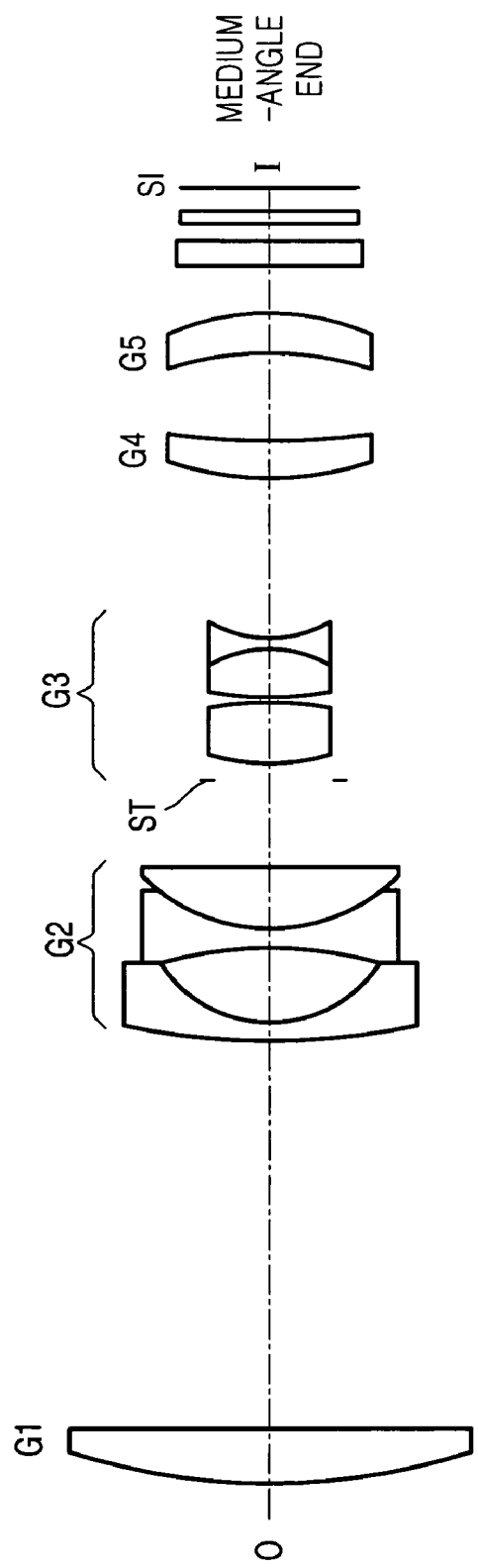
FIG. 3A
FIG. 3B

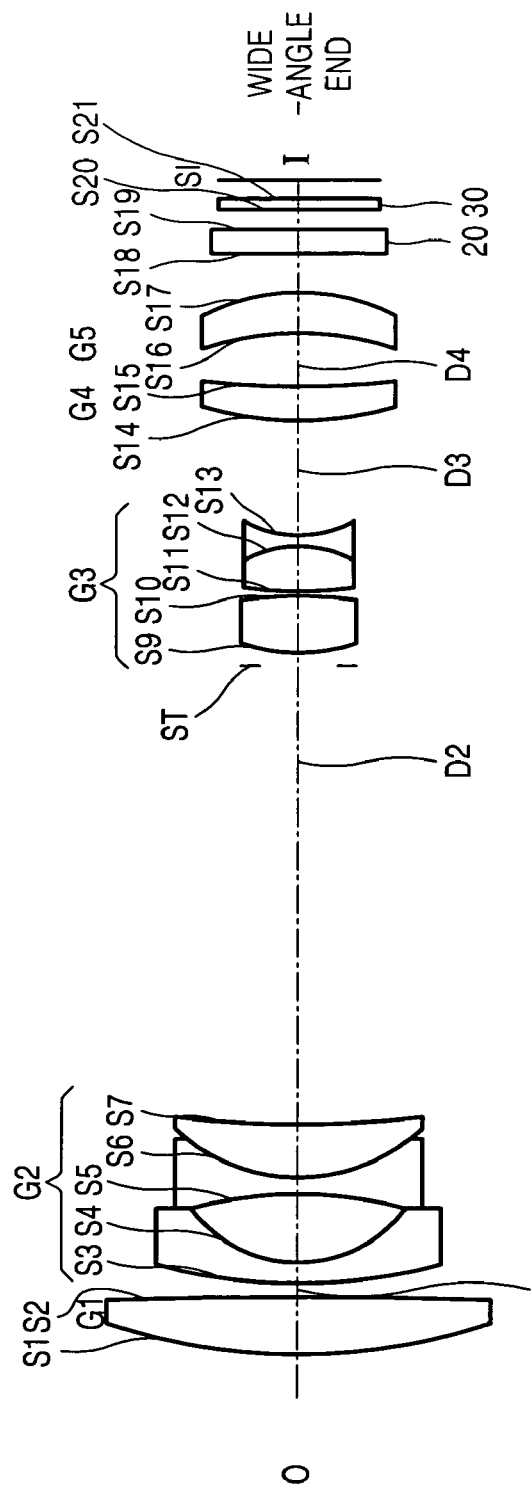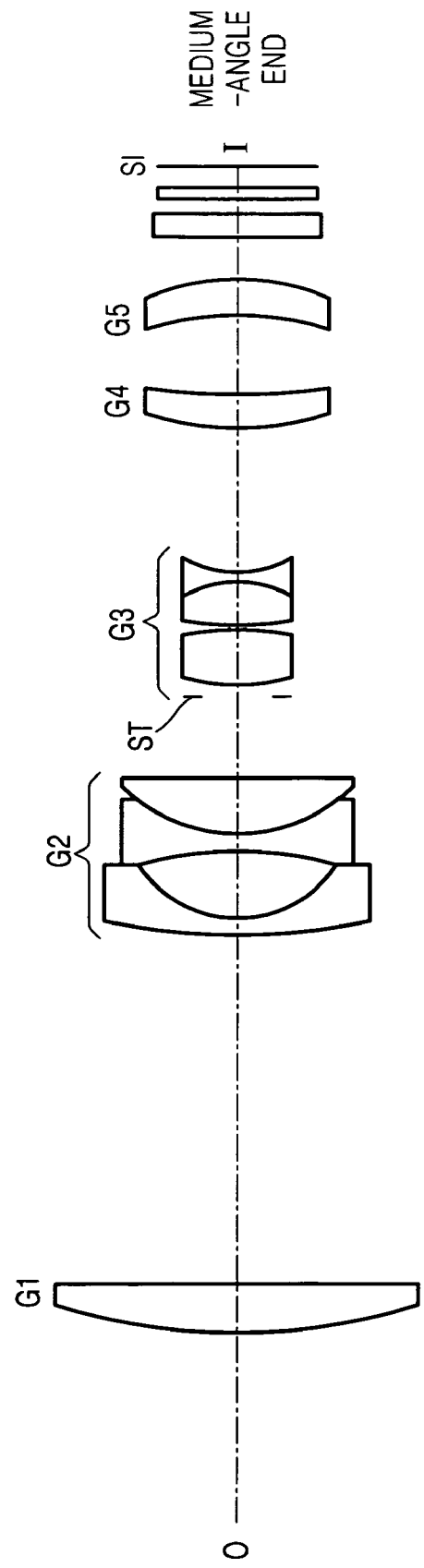
FIG. 6A
FIG. 6B

HIGH MAGNIFICATION ZOOM LENS SYSTEM

This application claims the priority of Korean Patent Application No. 2004-28161, filed on Apr. 23, 2004, in the Korean Intellectual Property Office, the disclosure of which is incorporated herein in its entirety by reference.

BACKGROUND OF THE INVENTION

1. Field of the Invention

The present invention relates to a zoom lens, and more particularly, to a compact, high magnification zoom lens having a long back focal length and telecentricity.

2. Description of the Related Art

Generally, a zoom lens used in a still camera and a video camera requires excellent optical performance, high magnification, and compactness. Moreover, with the widespread use of electronic equipment such as personal digital assistants (PDAs) and other mobile terminals, digital cameras and digital video units are increasingly being installed in such equipment. As a result, there is a growing demand for increasingly compact cameras and camera lenses.

Japanese Patent Publication No. 2002-156581 discloses a zoom lens. As shown in FIGS. 1A and 1B, the zoom lens includes a first lens group having a positive refractive power, a second lens group having a negative refractive power, a third, a fourth, and a fifth lens group having positive refractive powers, and an aperture diaphragm in the vicinity of the third lens group. The second lens group is linearly moved toward the third group. The fourth lens group is moved from the vicinity of the fifth lens group to a long focus end position located in the vicinity of the third lens group. The second and fourth lens groups function in association to accomplish magnification change.

In such a zoom lens, since the second and fourth lens groups are moved to change magnification and the first and third lens group are fixed, the entire optical system becomes too large to compensate for performance at a wide angle end.

Japanese Patent Publication No. 2002-365548 also discloses a zoom lens. As shown in FIGS. 2A through 2C, the zoom lens includes sequentially from an object side a first lens group G1 having a positive refractive power, a second lens group G2 having a negative refractive power, and a third lens group G3, a fourth lens group G4, and a fifth lens group G5 each having positive refractive powers. The first through fifth lens groups G1, G2, G3, G4, and G5 are moved to change magnification. This zoom lens includes many lenses and is thus suitable for high magnification but is not appropriate for miniaturization. In addition, since this zoom lens uses a charged-coupled device, a quartz crystal filter is required to prevent a moire phenomenon caused by a periodic structure of the charged-coupled device. In consideration of the thickness and position of the quartz crystal filter, a long back focal length must be secured. Particularly, telecentricity of light incident onto an image plane is very important. However, in such a structure, it is difficult to secure the long back focal length since the fifth lens group G5 is moved to accomplish magnification change, and it is difficult to accomplish the telecentricity.

SUMMARY OF THE INVENTION

The present invention provides a compact, high magnification zoom lens having a long back focal length and telecentricity.

According to an aspect of the present invention, there is provided a high magnification zoom lens including a first lens group including a single positive lens and having a positive refractive power, a second lens group having a negative refractive power, a third lens group having the positive refractive power, a fourth lens group having the positive refractive power, and a fifth lens group having the positive refractive power. The first through fifth lens groups are sequentially arranged from an object side toward an image side. The first lens group, the second lens group, and the third lens group are moved in a direction of an optical axis to change magnification. The fourth lens group is moved to compensate for a movement of a focal position occurring during the magnification change, and the fifth lens group is fixed.

The second lens group may satisfy $$0.6 \leq \frac{|f_2|}{\sqrt{f_W f_T}} \leq 1.0,$$

where $f_W$ is an entire focal length at a wide-angle end (setting), $f_T$ is an entire focal length at a telephoto end, and $f_2$ is a focal length of the second lens group.

The fifth lens group may satisfy $$2 \leq \frac{|f_5|}{\sqrt{f_W f_T}} \leq 3,$$

where $f_W$ is an entire focal length at a wide-angle end, $f_T$ is an entire focal length at a telephoto end, and $f_5$ is a focal length of the fifth lens group.

According to another aspect of the present invention, there is provided a zoom lens including a first lens group having a positive refractive power, a second lens group having a negative refractive power, a third lens group having the positive refractive power, a fourth lens group having the positive refractive power, and a fifth lens group having the positive refractive power. The first through fifth lens groups are sequentially arranged from an object side toward an image side. The first lens group, the second lens group, and the third lens group are moved in a direction of an optical axis to change magnification. The second lens group satisfies $$0.6 \leq \frac{|f_2|}{\sqrt{f_W f_T}} \leq 1.0,$$

where $f_W$ is an entire focal length at a wide-angle end, $f_T$ is an entire focal length at a telephoto end, and $f_2$ is a focal length of the second lens group.

The fourth lens group may be moved to compensate for a movement of a focal position occurring during the magnification change, and the fifth lens group may be fixed.

The fifth lens group may satisfy $$2 \leq \frac{|f_5|}{\sqrt{f_W f_T}} \leq 3,$$

where $f_5$ is a focal length of the fifth lens group.

The third lens group may satisfy $$0.8 \leq \frac{|f_3|}{\sqrt{f_W f_T}} \leq 1.2,$$

where $f_3$ is a focal length of the third lens group.

The zoom lens may further include a diaphragm between the second lens group and the third lens group, wherein the diaphragm is moved together with the third lens group.

The second lens group may include a first lens having the positive refractive power, a second lens having the negative refractive power, and a third lens having the positive refractive power, which are sequentially arranged from the object side.

The third lens group may include a first lens having the positive refractive power, a second lens having the positive refractive power, and a third lens having the negative refractive power, which are sequentially arranged from the object side.

The fifth lens group may include a single aspherical lens.

According to still another aspect of the present invention, there is provided a zoom lens including a first lens group having a positive refractive power, a second lens group having a negative refractive power, a third lens group having the positive refractive power, a fourth lens group having the positive refractive power, and a fifth lens group having the positive refractive power. The first through fifth lens groups are sequentially arranged from an object side toward an image side. To change magnification, the first and third lens groups are linearly moved such that a distance between the first and third lens groups is maintained constant and the second lens group is moved.

BRIEF DESCRIPTION OF THE DRAWINGS

The above and other features and advantages of the present invention will become more apparent by describing in detail preferred embodiments thereof with reference to the attached drawings in which:

FIGS. 3A through 3C illustrate structures of a high magnification zoom lens at the wide-angle end, the medium-angle end, and the telephoto end, respectively, according to an embodiment of the present invention;

FIGS. 6A through 6C illustrate structures of a high magnification zoom lens at the wide-angle end, the medium-angle end, and the telephoto end, respectively, according to another embodiment of the present invention;

DETAILED DESCRIPTION OF THE INVENTION

Figure 1A:
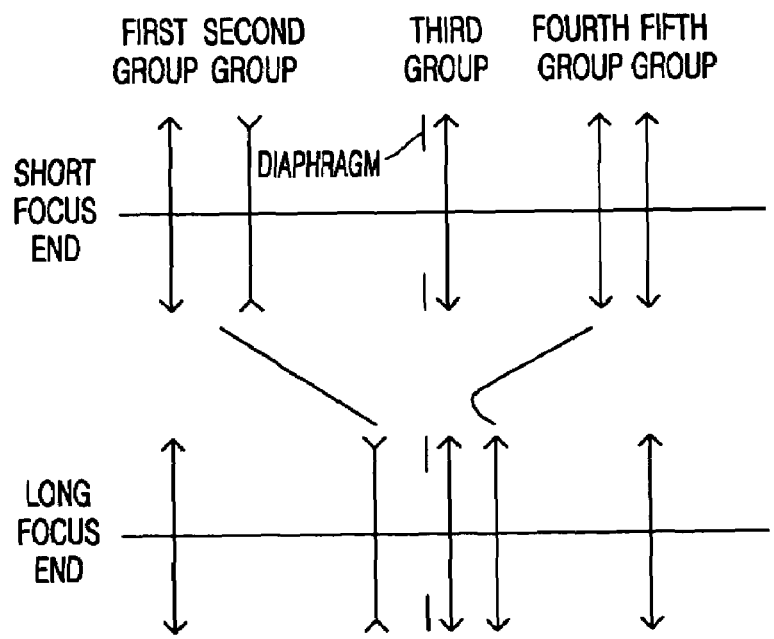
FIGS. 1A and 1B illustrate magnification change in a zoom lens disclosed in Japanese Patent Publication No. 2002-156581.
Figure 1B:
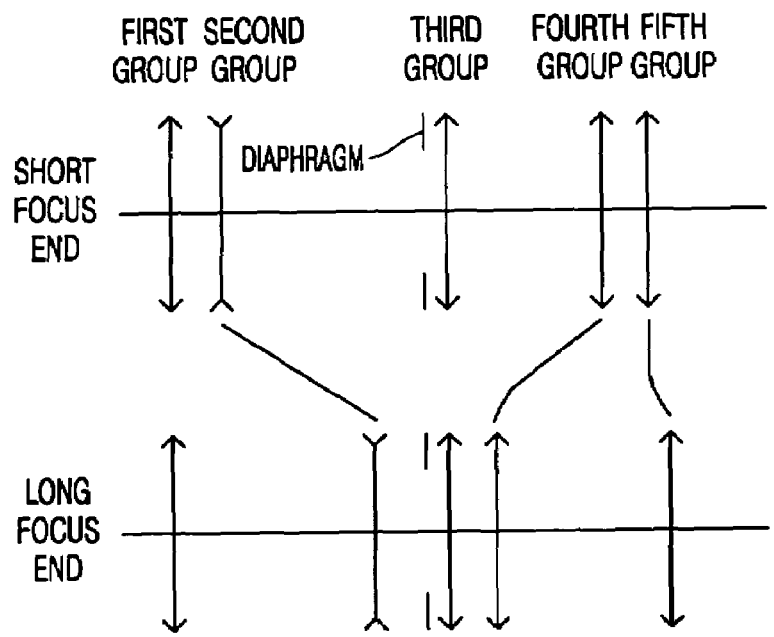
Figure 2A:
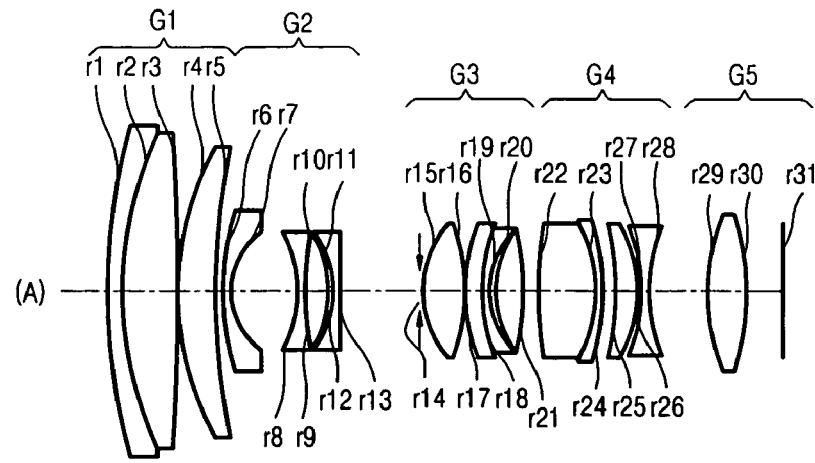
FIGS. 2A through 2C illustrate structures of a zoom lens at a wide-angle end, a medium-angle end, and a telephoto end, respectively, disclosed in Japanese Patent Publication No. 2002-365548.
Figure 2B:
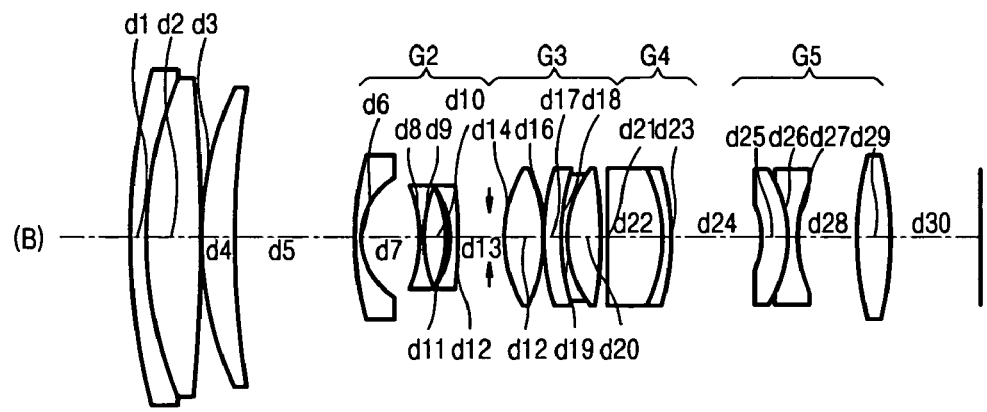
Figure 2C:
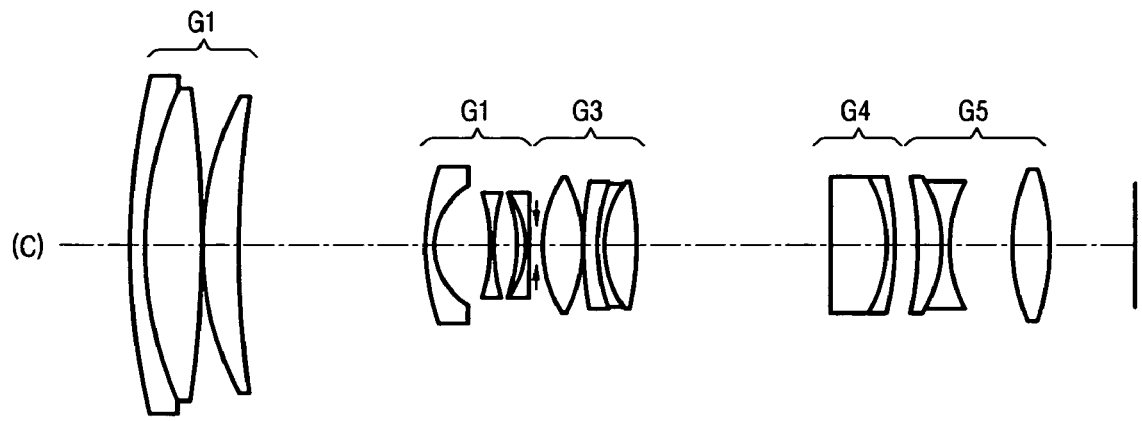
Figure 3C:
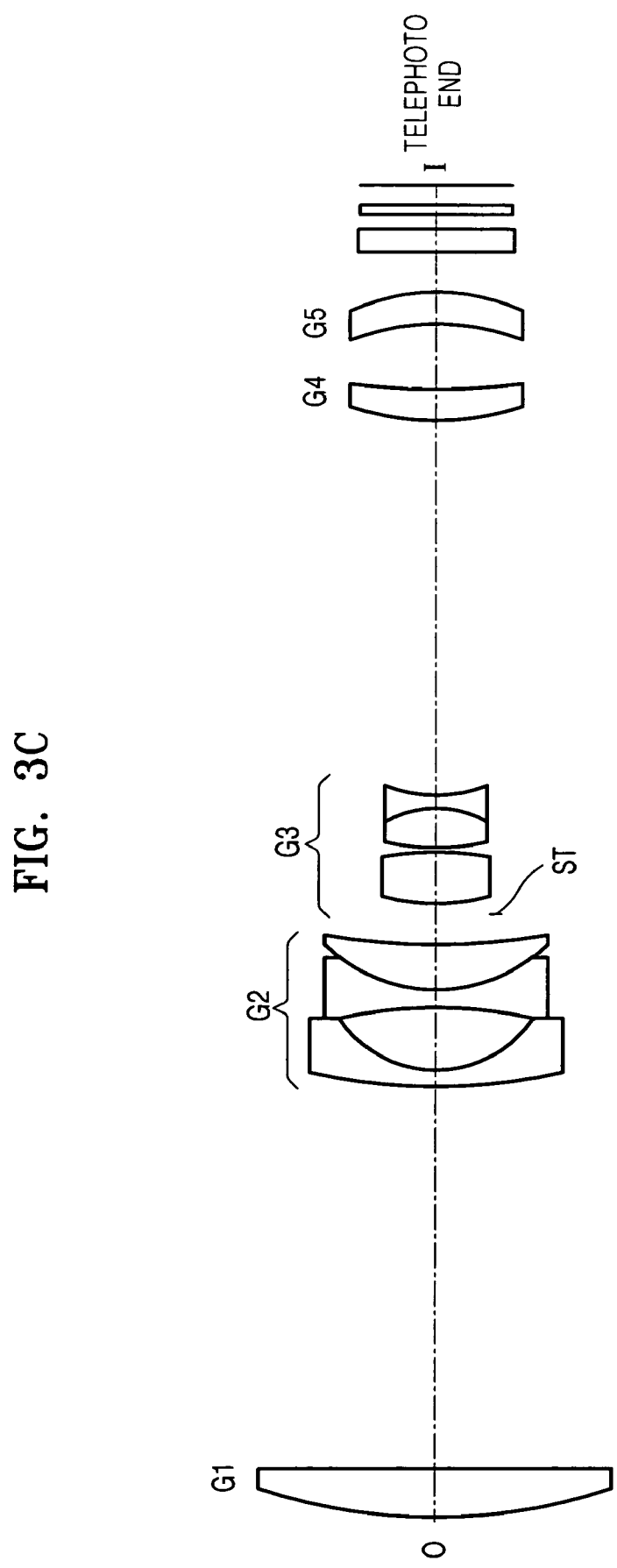

Referring to FIGS. 3A through 3C, a high magnification zoom lens according to an embodiment of the present invention includes sequentially from an object side, a first lens group G1 having a positive refractive power, a second lens group G2 having a negative refractive power, a third lens group G3, a fourth lens group G4, and a fifth lens group G5 which each have positive refractive powers, and a diaphragm ST that is moved together with the third lens group G3.

The first and third lens groups G1 and G3 are linearly, i.e., monotonously, moved along an optical axis. The second lens group G2 may be moved non-linearly—for example, forming a curve that is convex toward the image side, according to magnification change.

The fourth lens group G4 compensates for a focus position according to movement of an image plane caused by magnification change and a position of an object. The fourth lens group G4 may be implemented by a single lens in order to miniaturize the zoom lens system. The fifth lens group G5 functions to realize telecentricity when a charged-coupled device is used as the medium for image forming.

The first lens group G1 includes a single positive lens formed of a low-dispersion material. The second lens group G2 includes a first negative lens, a second negative lens, and a positive lens, sequentially, from the object side. A 'positive lens' has a positive refractive power and a 'negative lens' has a negative refractive power. The second negative lens is formed of a low-dispersion material such that color aberration is satisfactorily compensated for, even at a 4× to 5×zoom magnification.

The third lens group G3 disperses a refractive power to accomplish satisfactory optical performance throughout a picture, has an aspherical surface to minimize distortion, and has a sufficient image forming power to be suitable for a high-resolution image pickup device. The fourth lens group G4 includes a single positive lens to reduce the number of movable groups during focusing. The fifth lens group G5 includes a single positive lens and compensates for distortion and field curvature by appropriately using an aspherical surface.

A zoom lens according to embodiments of the present invention may satisfy conditions expressed by Formulae (1) and (2)

$$0.6 \leq \frac{|f_2|}{\sqrt{f_W f_T}} \leq 1.0 \quad (1)$$

$$0.8 \leq \frac{|f_3|}{\sqrt{f_W f_T}} \leq 1.2 \quad (2)$$

Here, $f_W$ is an entire focal length at a wide-angle end (setting), $f_T$ is an entire focal length at a telephoto end, $f_2$ is a focal length of the second lens group G2, and $f_3$ is a focal length of the third lens group G3.

Formula (1) expresses a ratio of the focal length of the second lens group G2 to a combined focal length at both of the wide-angle end and the telephoto end. When the ratio exceeds the maximum limit, the refractive power of the second lens group G2 is decreased. As a result, the entire length of the optical system is increased, the back focal length required at the wide-angle end is difficult to obtain, and aberration greatly changes during magnification change. Conversely, when the ratio is less than the minimum limit, the negative refractive power of the second lens group G2 is increased, thereby decreasing telecentricity.

Formula (2) expresses a ratio of the focal length of the third lens group G3 to a combined focal length at both of the wide-angle end and the telephoto end. When the ratio exceeds the maximum limit, the refractive power of the third lens group G3 is decreased. As a result, the amount of movement of the third lens group G3 from the wide-angle end to the telephoto end is increased, thereby increasing the entire length of the zoom lens. Conversely, when the ratio is less than the minimum limit, the refractive power of the third lens group G3 is increased. As a result, it is difficult to secure the back focal length required at the wide-angle end and it is difficult to compensate for spherical aberration, comatic aberration, and astigmatism.

In addition, the zoom lens according to embodiments of the present invention may satisfy a condition expressed by Formula (3) to improve telecentricity.

$$2 \leq \frac{|f_5|}{\sqrt{f_W f_T}} \leq 3 \quad (3)$$

Here, $f_5$ is a focal length of the fifth lens group G5. When a ratio shown in Formula (3) is less than the minimum limit, the fifth lens group G5 has excessive refractive power, thereby degrading telecentricity at the telephoto end. When the ratio exceeds the maximum limit, the fifth lens group G5 lacks in refractive power, thereby degrading telecentricity at the wide-angle end.

In embodiments of the present invention, when magnification is changed, at least one group of the first and third lens groups G1 and G3 is linearly moved toward an object in a linear path and the second lens group G2 is moved forming a curve that is convex toward the image side, thereby decreasing an outer radius of the first lens group G1 and an entire length of the zoom lens and controlling aberration variation. In addition, a distance between the first lens group G1 and the third lens group G3 may be maintained constant during the magnification change so that movable groups can be easily moved. In other words, since only a single moving unit is required to move the first and third lens groups G1 and G3 together, the structure of the zoom lens is simplified.

Alternatively, only the third lens group G3 may be linearly moved and the distance between the first lens group G1 and the third lens group G3 may not be constant. The fourth lens group G4 may be implemented by a single positive lens to perform focusing. The fifth lens group G5 may be implemented by a single positive lens to miniaturize the barrel of the zoom lens.

In various embodiments of the present invention, a zoom lens includes lenses satisfying optimizing conditions for miniaturization of the zoom lens. Hereinafter, detailed lens data used for a zoom lens in various embodiments of the present invention will be described.

First Embodiment

Hereinafter, "f" denotes a combined focal length of an entire lens system, Fno denotes an F number, 2ω denotes angle of view, R denotes radius of curvature, D denotes a thickness of a center of a lens or a distance between lenses, Nd denotes a refractive index, and Vd denotes an Abbe number.

FIGS. 3A through 3C illustrate a zoom lens according to a first embodiment of the present invention. FIG. 3A illustrates the zoom lens at the wide-angle end. FIG. 3B illustrates the zoom lens at the medium-angle end. FIG. 3C illustrates the zoom lens at the telephoto end.

Referring to FIG. 3A, a first lens group G1, a second lens group G2, a third lens group G3, a fourth lens group G4, and a fifth lens group G5 are sequentially arranged from an object O toward an image I. Each of the first, fourth, and fifth lens groups G1, G4, and G5 may include a single lens. Particularly, the fifth lens group G5 may include a single aspherical lens.

The second and third lens groups G2 and G3 may include one or more lenses. The third lens group G3 may include at least one aspherical lens. Reference numerals 20 and 30 denote an infrared filter and a cover glass, respectively.

At least one of the first and third lens groups G1 and G3 is linearly moved while the second lens group G2 is non-linearly moved, e.g., forming a curve convex toward an image, to change magnification. The fourth lens group G4 compensates for a focal position according to movement of an image plane caused by magnification change and a position of the object O. The fifth lens group G5 is designed to satisfy telecentricity required when a charged-coupled device is used as an image forming medium. In other words, the fifth lens group G5 makes a main beam of an incident light flux incident onto the charged-coupled device at a vertical angle.

The first, second, and third lens groups G1, G2, and G3 are moved to change magnification of the zoom lens and the fourth lens group G4 is moved to correspond to the movement for the magnification change. As a result, a distance D1 between the first and second lens groups G1 and G2, a distance D2 between the second and third lens groups G2 and G3, a distance D3 between the third and fourth lens groups G3 and G4, and a distance D4 between the fourth and fifth lens groups G4 and G5 are changed.

A diaphragm ST is placed between the second and third lens groups G2 and G3 and is moved together with the third lens group G3.

Table 1 shows detailed lens data for the zoom lens according to the first embodiment of the present invention. Here, Sn represents each of lens surfaces and SI represents an image surface.

TABLE 1

F: 5.92–17.24–28.48 Fno: 2.89–4.03–5.16
2ω: 64.61–22.97–14.10

| Lens surface | R | D | Nd | Vd |
|---|---|---|---|---|
| S1 | 26.91300 | 2.570000 | 1.48749 | 70.4 |
| S2 | −385.24200 | D1 (Variable) | | |
| S3 | 28.43100 | 0.900000 | 1.80518 | 25.5 |
| S4 | 6.10600 | 3.180000 | | |
| S5 | −20.20500 | 0.800000 | 1.48749 | 70.4 |
| S6 | 7.84300 | 2.620000 | 1.84666 | 23.8 |
| S7 | 53.51100 | D2 (Variable) | | |
| ST | Infinite | 0.500000 | | |
| S9 | 9.07400 | 2.610000 | 1.58313 | 59.5 |
| | Aspherical shape | | | |
| | K: −2.101830 | | | |
| | A: −0.273250E−03, B: −0.425896E−05, | | | |
| | C: −0.841175E−06, D: 0.131540E−07 | | | |
| S10 | −19.27100 | 0.250000 | | |
| S11 | 14.28600 | 2.080000 | 1.77250 | 49.6 |
| S12 | −5.14500 | 0.600000 | 1.64769 | 33.8 |
| S13 | 5.14500 | D3 (Variable) | | |
| S14 | 13.95700 | 1.660000 | 1.67003 | 47.2 |
| S15 | 37.79100 | D4 (Variable) | | |
| S16 | −17.70200 | 1.810000 | 1.58313 | 59.5 |
| | +TC Aspherical shape | | | |
| | K: 0.000000 | | | |
| | A: −0.352234E−03 B: 0.504652E−05, | | | |
| | C: −0.399563−06, D: 0.106903E−07 | | | |
| S17 | −9.90700 | 2.026000 | | |
| S18 | Infinite | 1.100000 | 1.51680 | 64.2 |
| S19 | Infinite | 0.800000 | | |
| S20 | Infinite | 0.500000 | 1.51680 | 64.2 |
| S21 | Infinite | 1.000000 | | |
| SI | Infinite | | | |

Table 2 shows examples of the variable distances D1, D2, D3, and D4 at the wide-angle end, the medium-angle end, and the telephoto end in the zoom lens according to the first embodiment of the present invention.

TABLE 2

| | Wide-angle end | Medium-angle end | Telephoto end |
|---|---|---|---|
| D1 | 0.800 | 12.880 | 16.308 |
| D2 | 17.008 | 4.928 | 1.500 |
| D3 | 3.238 | 10.495 | 19.365 |
| D4 | 2.499 | 3.709 | 3.197 |

Referring to Table 2, (D1+D2) is constant. As a result, a distance between the first lens group G1 and the third lens group G3 is maintained constant during magnification change.

The following description concerns definition of the term "aspherical shape" used in this specification. When an optical axis is set as an X-axis, a line perpendicular to the optical axis is set as a Y-axis, and a progressing direction of a light beam is defined as being positive, the aspherical shape can be expressed by Formula (4).

$$x = \frac{cy^2}{1 + \sqrt{1 - (K+1)c^2 y^2}} + Ay^4 + By^6 + Cy^8 + Dy^{10} \quad (4)$$

Here, "x" is a position variable from a vertex of a lens in an X-axis direction, "y" is a position variable from the vertex of the lens in a Y-axis direction, K is a conic constant, A, B, C, and D are aspheric coefficients, and "c" is a reciprocal of the radius of curvature, 1/R, at the vertex of the lens.

When aspherical lenses are appropriately arranged, mass production of zoom lenses is possible with a low manufacturing price.

Figure 4:
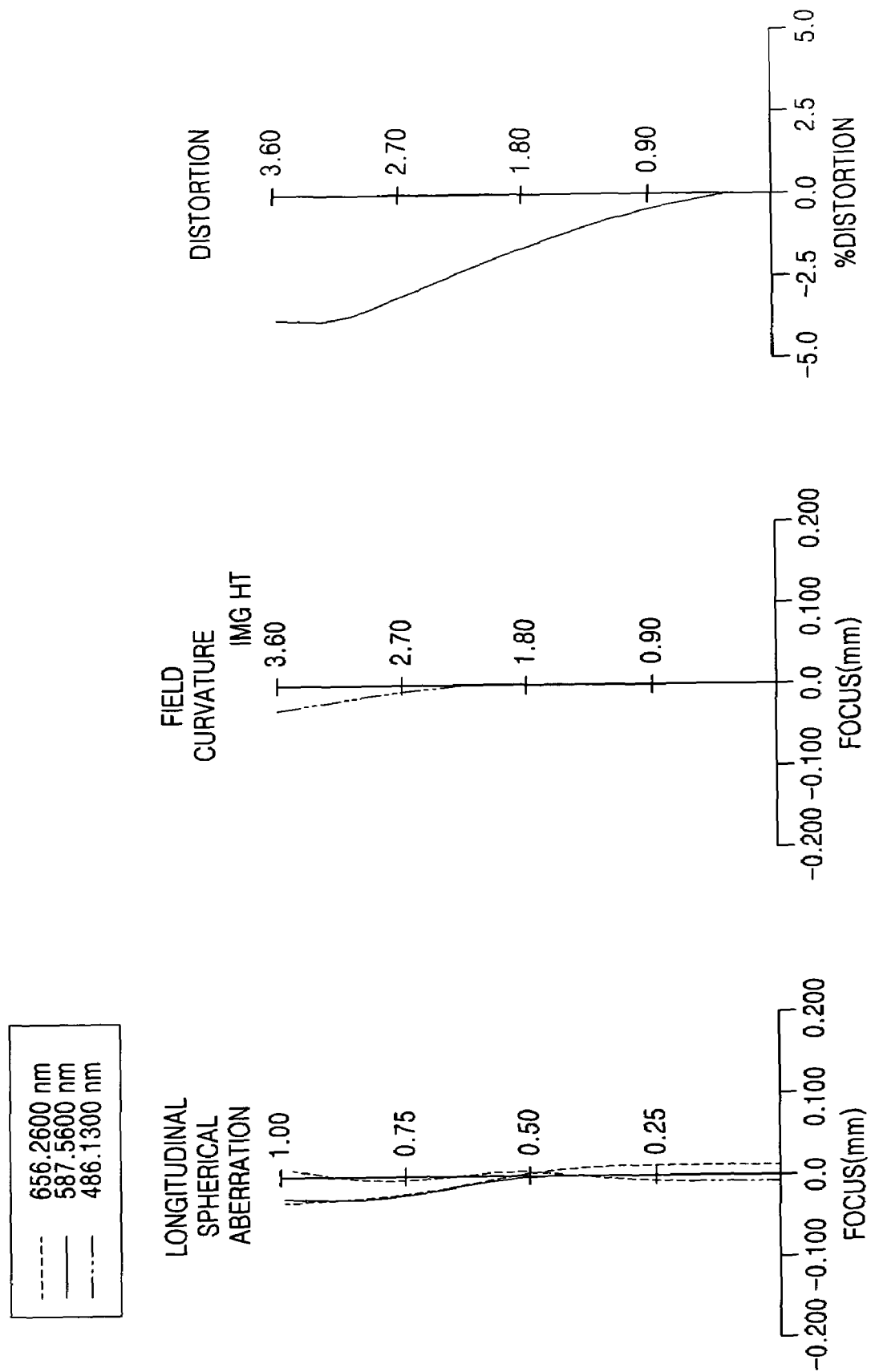
FIG. 4 illustrates spherical aberration, field curvature, and distortion at the wide-angle end of the high magnification zoom lens according to the embodiment illustrated in FIGS. 3A through 3C.
Figure 5:
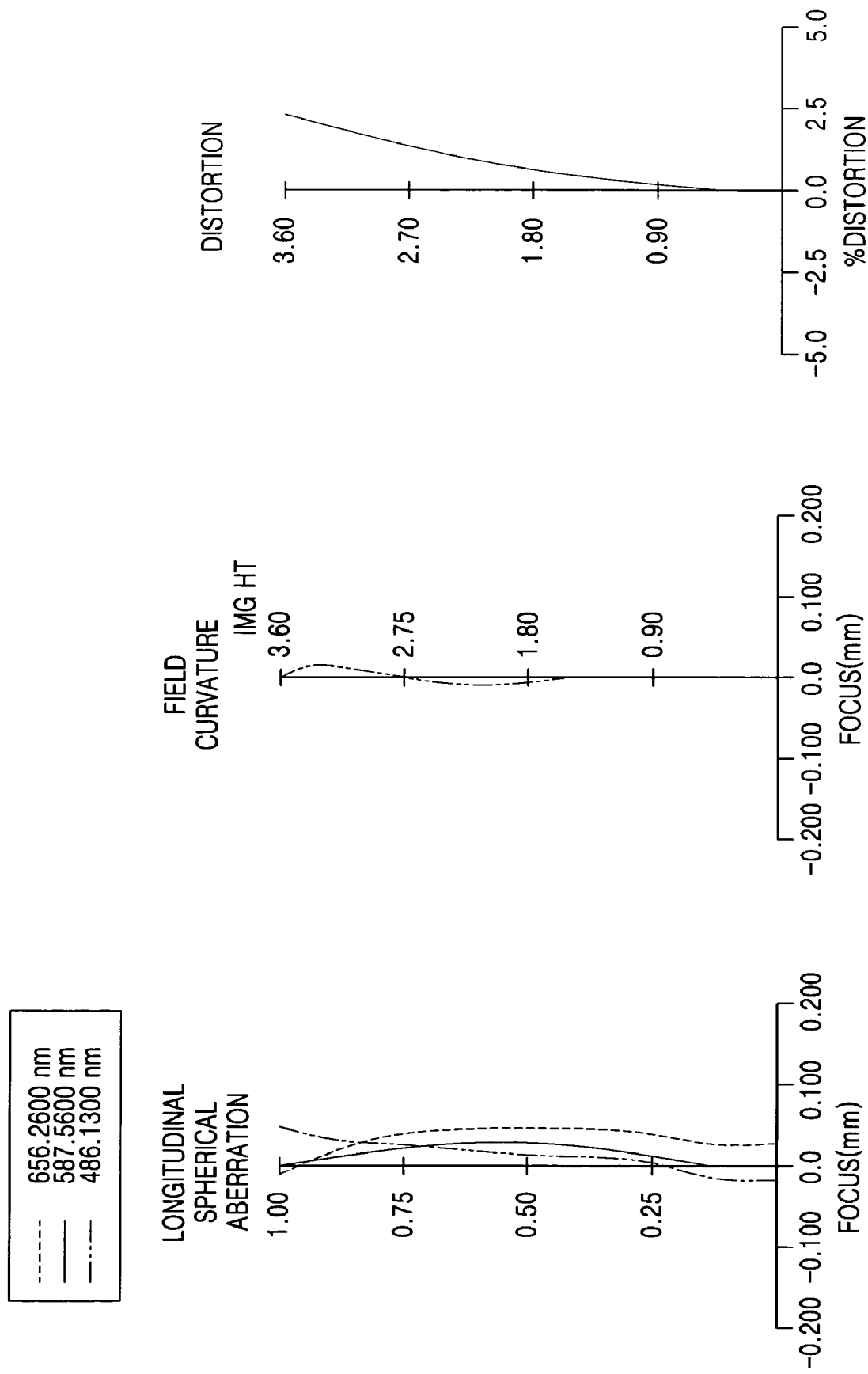
FIG. 5 illustrates the spherical aberration, the field curvature, and the distortion at the telephoto end of the high magnification zoom lens according to the embodiment illustrated in FIGS. 3A through 3C.

FIG. 4 illustrates spherical aberration, field curvature, and distortion at the wide-angle end of the zoom lens according to the first embodiment of the present invention. FIG. 5 illustrates the spherical aberration, the field curvature, and the distortion at the telephoto end of the zoom lens according to the first embodiment of the present invention.

Second Embodiment

Figure 6C:
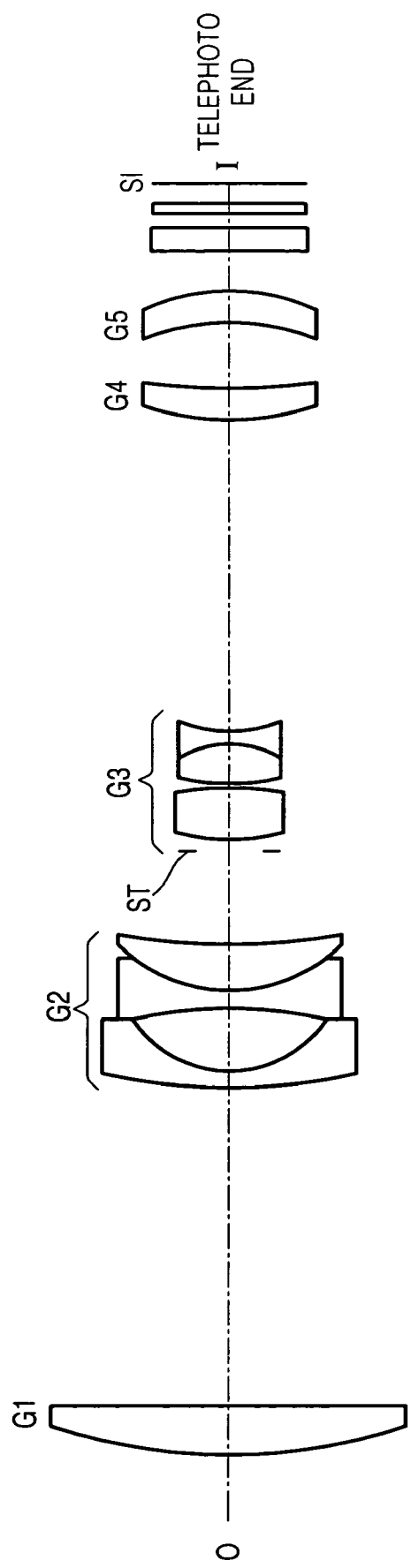

FIGS. 6A through 6C illustrate structures of a zoom lens at the wide-angle end, the medium-angle end, and the telephoto end, respectively, according to a second embodiment of the present invention. Table 3 shows detailed lens data for the zoom lens according to the second embodiment of the present invention.

TABLE 3

F: 5.97–17.09–28.70 Fno: 2.88–4.01–5.20
2ω: 64.07–23.18–14.00

| Lens surface | R | D | Nd | Vd |
|---|---|---|---|---|
| S1 | 26.36000 | 2.620000 | 1.49700 | 81.6 |
| S2 | −347.38800 | D1 (Variable) | | |
| S3 | 29.96700 | 0.900000 | 1.80518 | 25.5 |
| S4 | 6.06700 | 3.230000 | | |
| S5 | −19.18400 | 0.800000 | 1.48749 | 70.4 |
| S6 | 7.93200 | 2.850000 | 1.84666 | 23.8 |
| S7 | 62.88500 | D2 (Variable) | | |
| ST | Infinite | 0.500000 | | |
| S9 | 8.71200 | 2.200000 | 1.58313 | 59.5 |
| | Aspherical shape | | | |
| | K: −2.087960, | | | |
| | A: −0.297105E−03, B: −0.670691E−05, | | | |
| | C: −0.411460E−06, D: −0.164879E−07 | | | |
| S10 | −17.02200 | 0.640000 | | |
| S11 | 15.50300 | 2.100000 | 1.77250 | 49.6 |
| S12 | −4.92000 | 0.600000 | 1.64769 | 33.8 |
| S13 | 4.92000 | D3 (Variable) | | |
| S14 | 12.80500 | 1.670000 | 1.67003 | 47.2 |
| S15 | 30.26700 | D4 (Variable) | | |
| S16 | −18.77500 | 1.600000 | 1.58313 | 59.5 |
| | +TC Aspherical shape | | | |
| | K; 0.000000 | | | |
| | A: −0.346608E−03, B: 0.631166E−05, | | | |
| | C: −0.478767E−06, D: 0.124369E−07 | | | |
| S17 | −10.04800 | 1.568000 | | |
| S18 | Infinite | 1.100000 | 1.51680 | 64.2 |
| S19 | Infinite | 0.800000 | | |
| S20 | Infinite | 0.500000 | 1.51680 | 64.2 |
| S21 | Infinite | 1.000000 | | |
| SI | Infinite | | | |

Table 4 shows examples of the variable distances D1, D2, D3, and D4 at the wide-angle end, the medium-angle end, and the telephoto end in the zoom lens according to the second embodiment of the present invention.

TABLE 4

| | Wide-angle end | Medium-angle end | Telephoto end |
|---|---|---|---|
| D1 | 0.800 | 12.364 | 15.772 |
| D2 | 16.472 | 4.908 | 1.500 |
| D3 | 3.280 | 10.351 | 19.442 |
| D4 | 2.538 | 3.396 | 2.221 |

Figure 7:
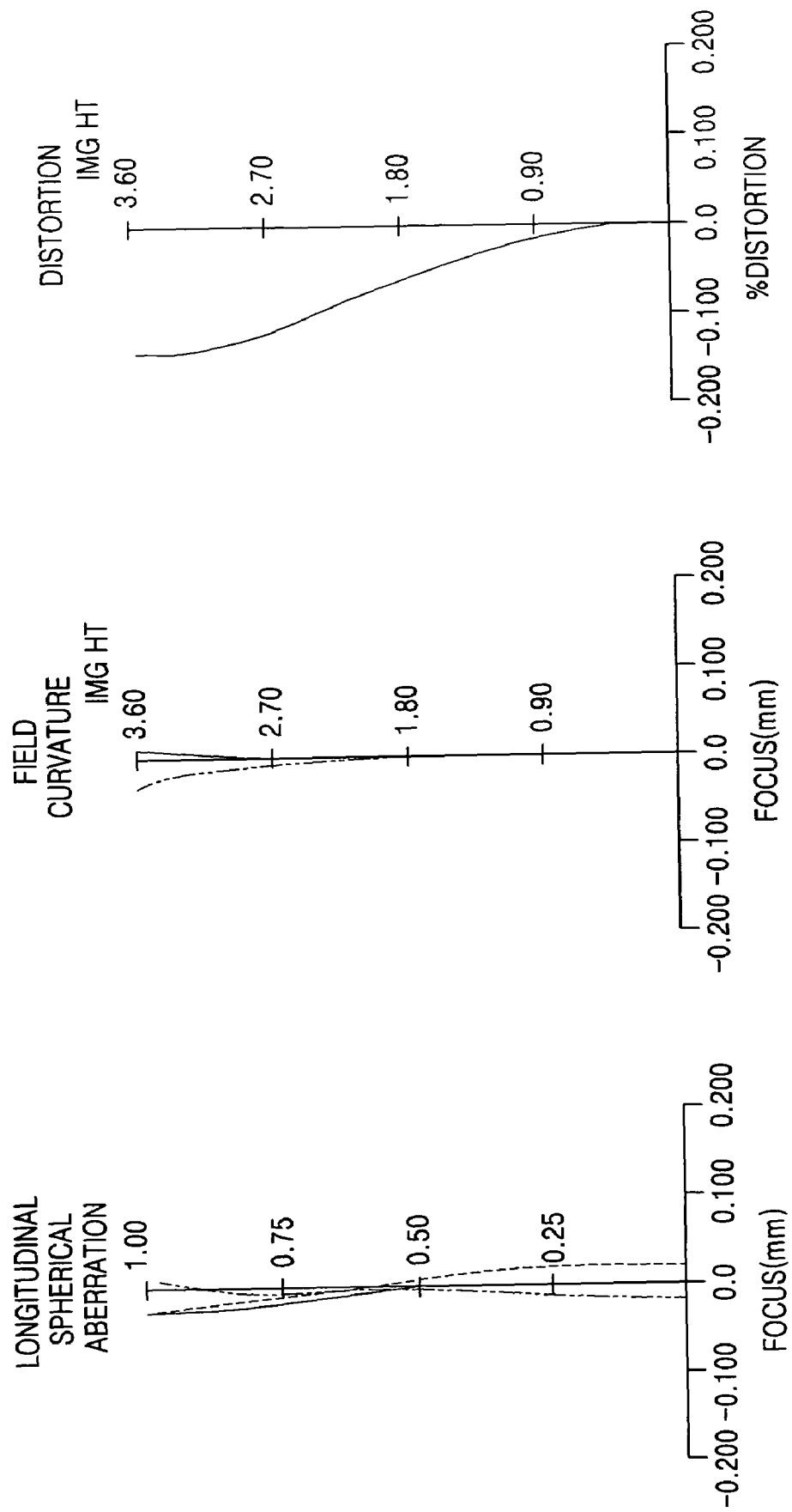
FIG. 7 illustrates the spherical aberration, the field curvature, and the distortion at the wide-angle end of the high magnification zoom lens according to the embodiment illustrated in FIGS. 6A through 6C.
Figure 8:
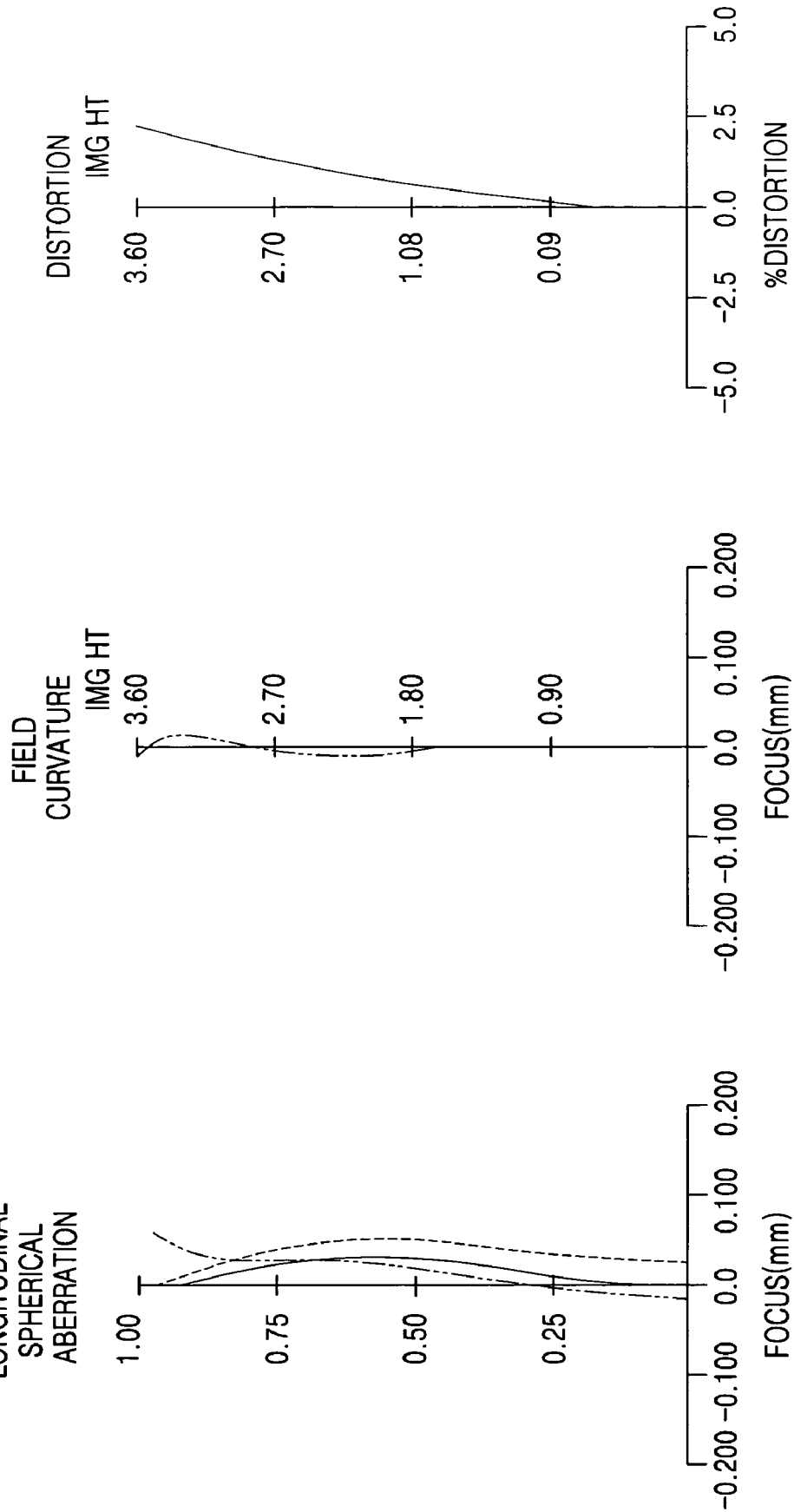
FIG. 8 illustrates the spherical aberration, the field curvature, and the distortion at the telephoto end of the high magnification zoom lens according to the embodiment illustrated in FIGS. 6A through 6C.

FIG. 7 illustrates the spherical aberration, the field curvature, and the distortion at the wide-angle end of the zoom lens according to the second embodiment of the present invention. FIG. 8 illustrates the spherical aberration, the field curvature, and the distortion at the telephoto end of the zoom lens according to the second embodiment of the present invention.

Third Embodiment

Figure 9A:
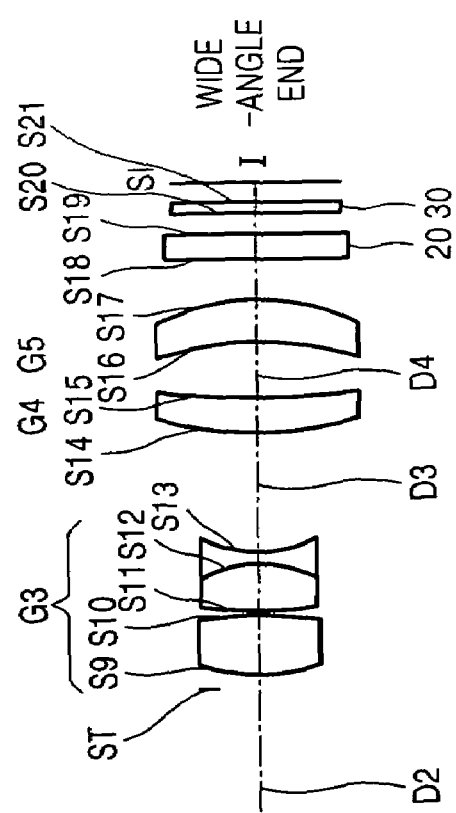
FIGS. 9A through 9C illustrate structures of a high magnification zoom lens at the wide-angle end, the medium-angle end, and the telephoto end, respectively, according to still another embodiment of the present invention.
Figure 9A:
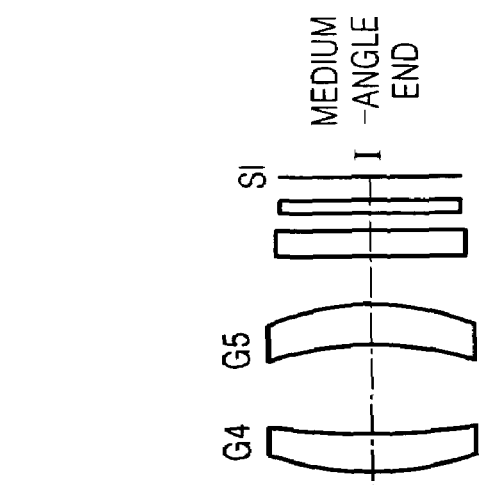
Figure 9B:
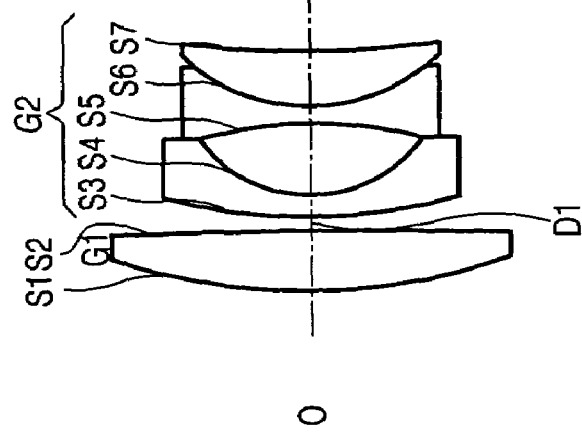
Figure 9B:
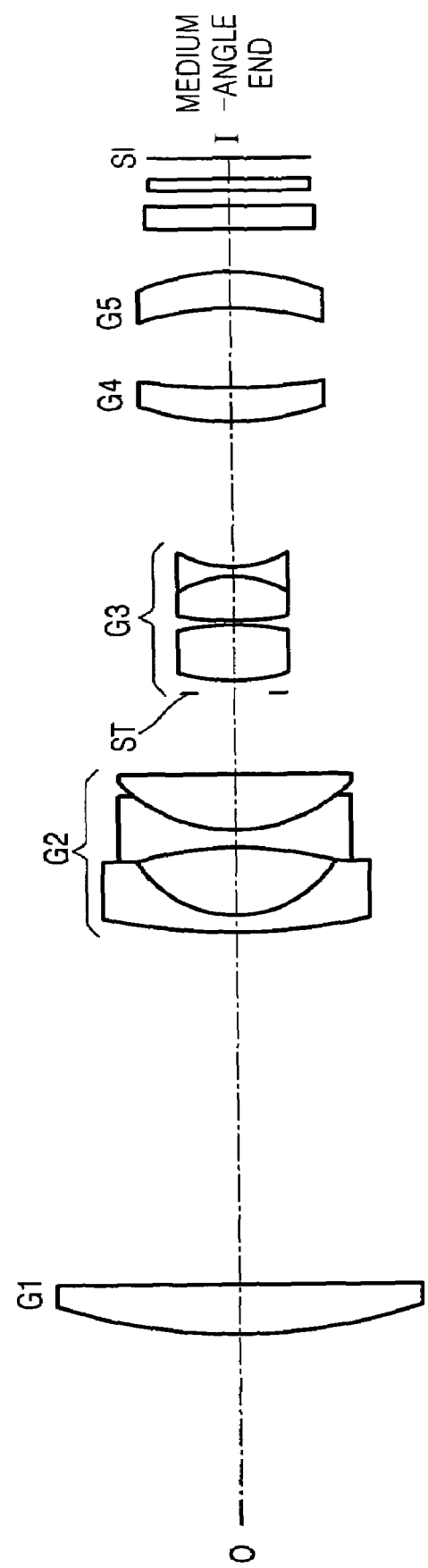
Figure 9C:
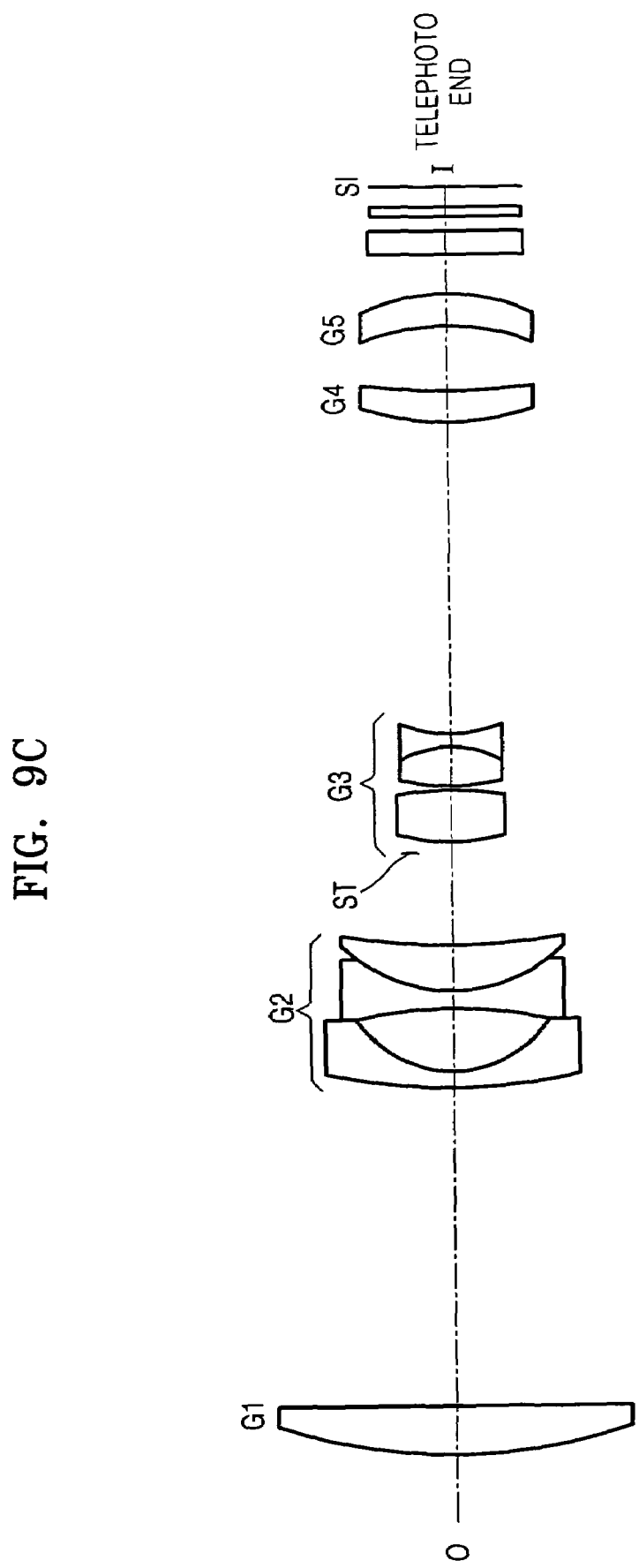

FIGS. 9A through 9C illustrate structures of a high magnification zoom lens at the wide-angle end, the medium-angle end, and the telephoto end, respectively, according to a third embodiment of the present invention. Table 5 shows detailed lens data for the zoom lens according to the third embodiment of the present invention.

TABLE 5

F: 5.94–16.91–28.51 Fno: 2.86–3.96–5.06
2ω: 64.47–23.44–14.08

| Lens surface | R | D | Nd | Vd |
|---|---|---|---|---|
| S1 | 28.06800 | 2.520000 | 1.48749 | 70.4 |
| S2 | −454.10000 | D1 (Variable) | | |
| S3 | 29.18800 | 0.900000 | 1.80518 | 25.5 |
| S4 | 6.35000 | 3.110000 | | |
| S5 | −21.81000 | 0.800000 | 1.48749 | 70.4 |
| S6 | 8.02000 | 2.570000 | 1.84666 | 23.8 |
| S7 | 55.00000 | D2 (Variable) | | |
| ST | Infinite | 0.500000 | | |
| S9 | 9.27000 | 2.800000 | 1.58313 | 59.5 |
| | Aspherical shape | | | |

K: −1.867481
A: −0.257419E−03, B: −0.210092E−05,
C: −0.123421E−05, D: 0.518916E−07

| S10 | −22.60000 | 0.110000 | | |
|---|---|---|---|---|
| S11 | 13.09000 | 2.070000 | 1.77250 | 49.6 |
| S12 | −5.38000 | 0.600000 | 1.64769 | 33.8 |
| S13 | 5.17700 | D3 (Variable) | | |
| S14 | 14.09800 | 1.680000 | 1.67003 | 47.2 |
| S15 | 39.53600 | D4 (Variable) | | |
| S16 | −22.03000 | 2.000000 | 1.58313 | 59.5 |
| | +TC Aspherical shape | | | |

K: 0.000000
A: −0.321365E−03, B: 0.621256E−05,
C: −0.425365E−06, D: 0.107997E−07

| S17 | −10.99000 | 1.948000 | | |
|---|---|---|---|---|
| S18 | Infinite | 1.100000 | 1.51680 | 64.2 |
| S19 | Infinite | 0.800000 | | |
| S20 | Infinite | 0.500000 | 1.51680 | 64.2 |
| S21 | Infinite | 1.000000 | | |
| SI | Infinite | | | |

Table 6 shows examples of the variable distances D1, D2, D3, and D4 at the wide-angle end, the medium-angle end, and the telephoto end in the zoom lens according to the third embodiment of the present invention. In the third embodiment, the third lens group G3 is linearly moved during magnification change and a distance between the first lens group G1 and the third lens group G3 is not maintained constant.

TABLE 6

| | Wide-angle end | Medium-angle end | Telephoto end |
|---|---|---|---|
| D1 | 0.800 | 13.220 | 17.122 |
| D2 | 18.130 | 5.352 | 1.500 |
| D3 | 3.362 | 10.484 | 19.354 |
| D4 | 2.419 | 3.419 | 2.803 |

Figure 10:
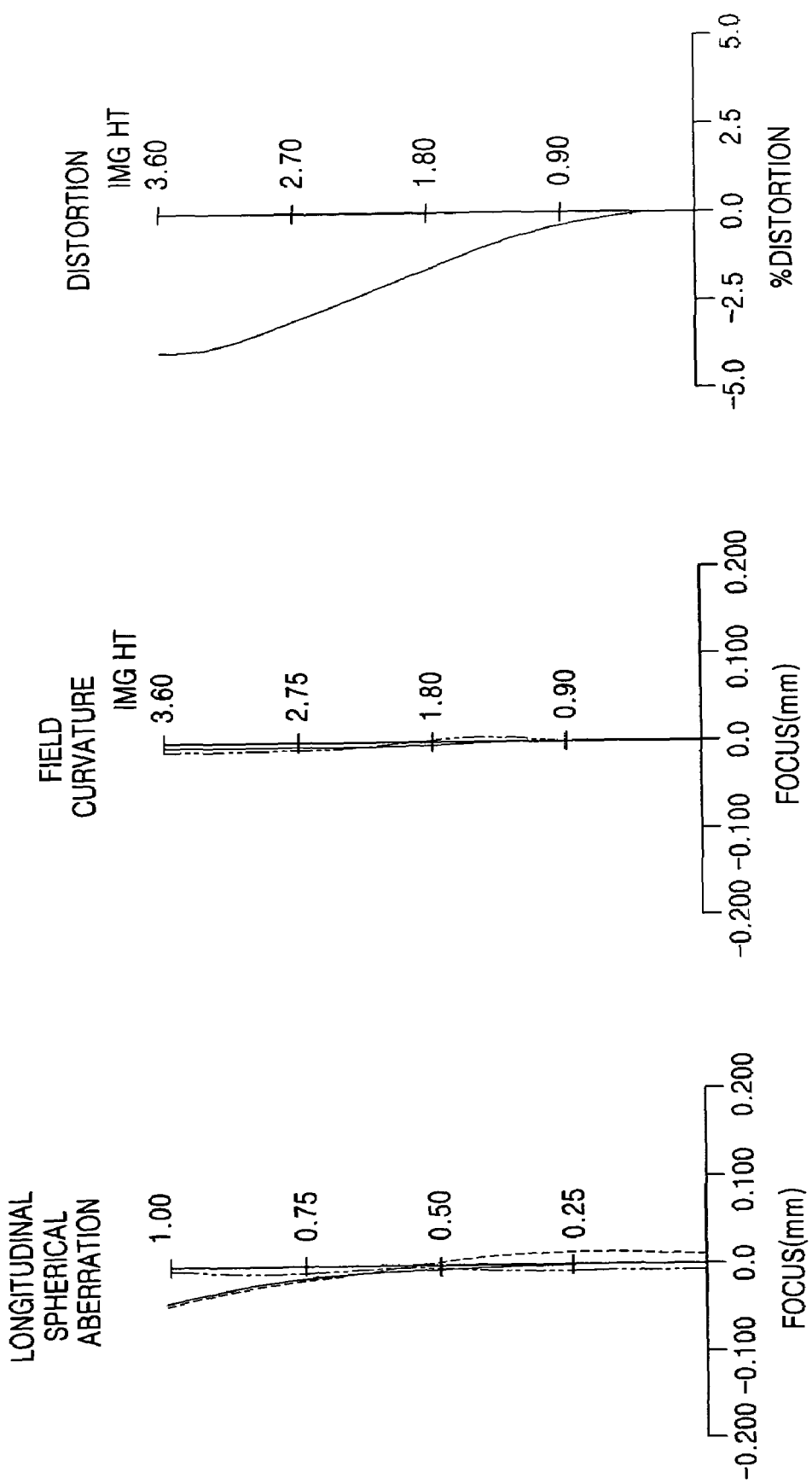
FIG. 10 illustrates the spherical aberration, the field curvature, and the distortion at the wide-angle end of the high magnification zoom lens according to the embodiment illustrated in FIGS. 9A through 9C.
Figure 11:
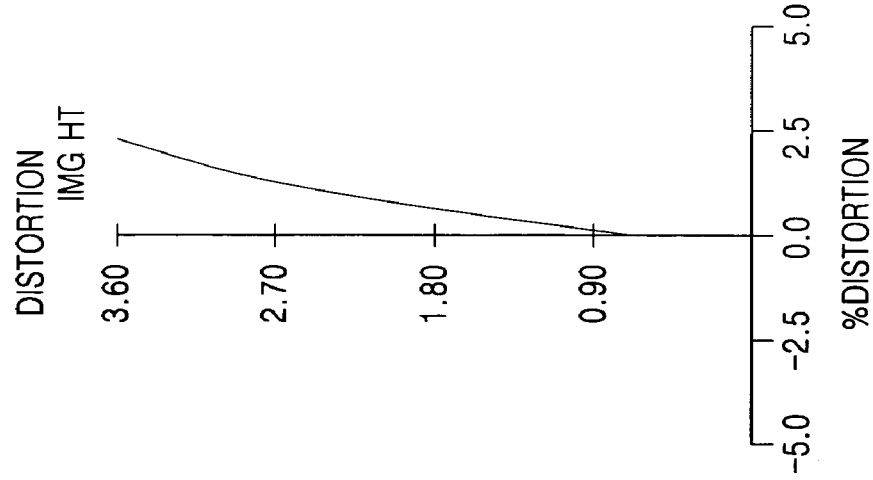
FIG. 11 illustrates the spherical aberration, the field curvature, and the distortion at the telephoto end of the high magnification zoom lens according to the embodiment illustrated in FIGS. 9A through 9C.
Figure 11:
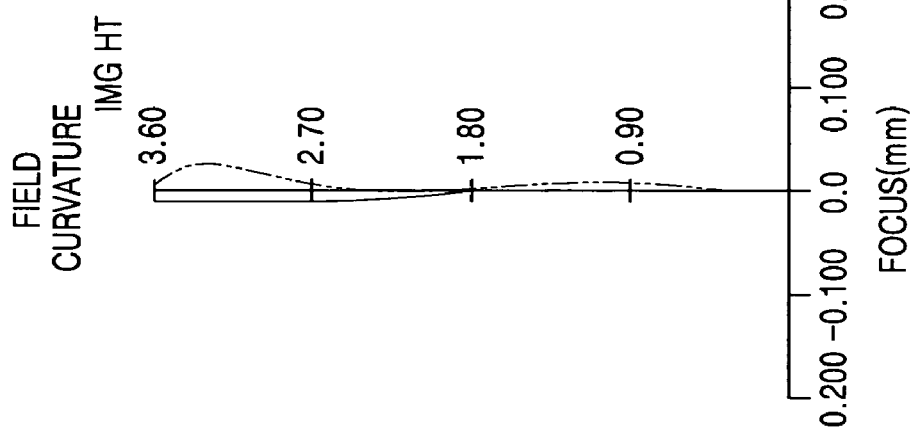
Figure 11:
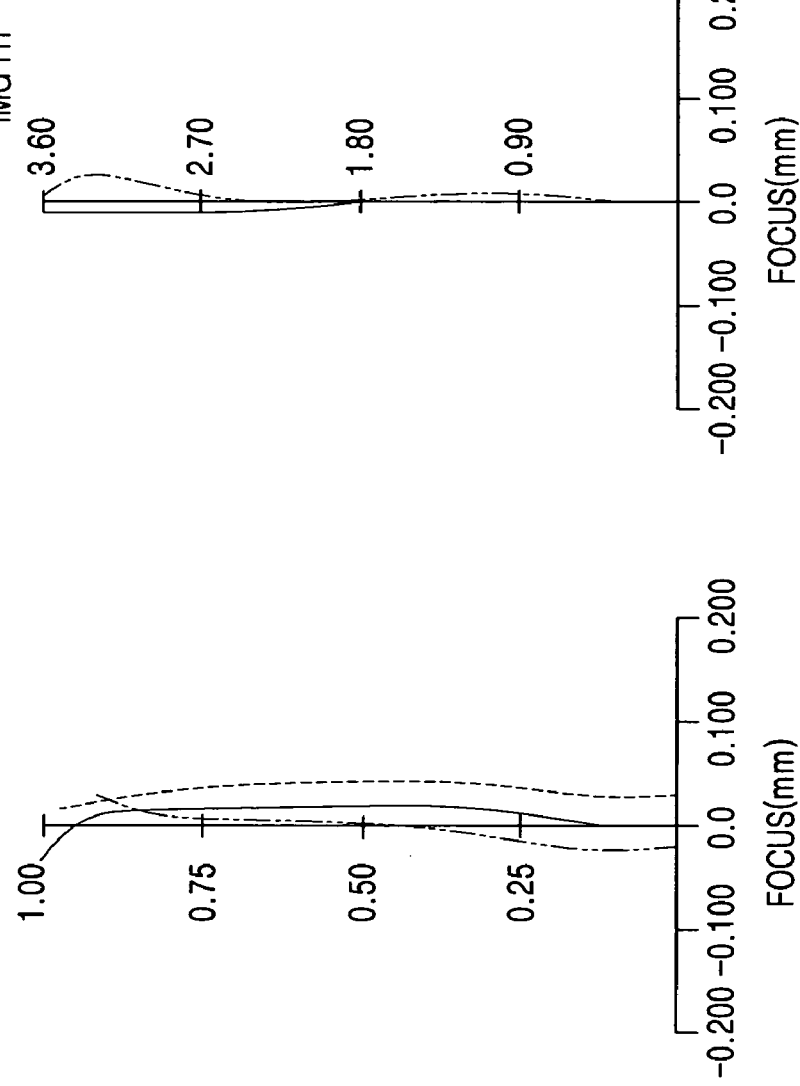

FIG. 10 illustrates the spherical aberration, the field curvature, and the distortion at the wide-angle end of the zoom lens according to the third embodiment. FIG. 11 illustrates the spherical aberration, the field curvature, and the distortion at the telephoto end of the zoom lens according to the third embodiment.

The zoom lenss according to the first through third embodiments of the present invention satisfy conditions expressed by Formulae (1), (2), and (3). This can be summarized into Table 7.

TABLE 7

| | First embodiment | Second embodiment | Third embodiment |
|---|---|---|---|
| Formula (1) | 0.82 | 0.81 | 0.88 |
| Formula (2) | 1.05 | 1.01 | 1.07 |
| Formula (3) | 2.74 | 2.65 | 2.71 |

As described above, in embodiments of the present invention, refractive powers of the second and third lens groups G2 and G3 are adjusted to obtain high magnification, to reduce an entire length of a lens system, and to increase a back focal length. The first and fourth lens groups G1 and G4 include a single lens to miniaturize a zoom lens. To accomplish telecentricity, the fifth lens group G5 is fixed during magnification change and has the positive refractive power.

According to the present invention, a zoom lens sequentially includes five lens groups, which are positive, negative, positive, positive, and positive, respectively. First, second, and third lens groups are moved to change magnification. A fourth lens group is used to compensate for aberration occurring during the magnification change. A refractive power of a fifth lens group is adjusted to obtain telecentricity. In a zoom lens, fundamental design including configuration of refractive power of an optical system and a position of a diaphragm is very important. In addition, it is important to make mass production of zoom lenss using an aspherical lens possible. In the present invention, refractive power of each lens group and a position of a diaphragm are determined to increase a back focal length, so that high magnification is obtained with a minimum number of lenses. As a result, a compact, high magnification zoom lens is realized. In particular, the first lens group is made to include a single lens to miniaturize the zoom lens. Since the present invention miniaturizes a zoom lens, it is usefully applied to portable information terminals, mobile compact cameras, and the like.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A zoom lens comprising:
   a first lens group comprising a single positive lens and having a positive refractive power;
   a second lens group having a negative refractive power;
   a third lens group having a positive refractive power and comprises at least one aspherical lens;

a fourth lens group having a positive refractive power; and a fifth lens group having a positive refractive power;

wherein the first through fifth lens groups are sequentially arranged from an object side toward an image side, and during magnification change, the first lens group, the second lens group, the third lens group, and the fourth lens group are moved and the fifth lens group is fixed.

2. The zoom lens of claim 1, wherein the fourth lens group compensates for movement of a focal position occurring during the magnification change.

3. The zoom lens of claim 1, wherein the second lens group satisfies $$0.6 \leq \frac{|f_2|}{\sqrt{f_W f_T}} \leq 1.0,$$

where $f_W$ is an entire focal length at a wide-angle end, $f_T$ is an entire focal length at a telephoto end, and $f_2$ is a focal length of the second lens group.

4. The zoom lens of claim 1, wherein the third lens group satisfies $$0.8 \leq \frac{|f_3|}{\sqrt{f_W f_T}} \leq 1.2,$$

where $f_W$ is an entire focal length at a wide-angle end, $f_T$ is an entire focal length at a telephoto end, and $f_3$ is a focal length of the third lens group.

5. The zoom lens of claim 1, wherein the fifth lens group satisfies $$2 \leq \frac{|f_5|}{\sqrt{f_W f_T}} \leq 3,$$

where $f_W$ is an entire focal length at a wide-angle end, $f_T$ is an entire focal length at a telephoto end, and $f_5$ is a focal length of the fifth lens group.

6. The zoom lens of claim 1, further comprising a diaphragm between the second lens group and the third lens group, wherein the diaphragm is moved together with the third lens group.

7. The zoom lens of claim 1, wherein a distance between the first lens group and the third lens group is maintained constant.

8. The zoom lens of claim 1, wherein the fifth lens group comprises a single aspherical lens.

9. The zoom lens of claim 1, wherein the first lens group consists of a single lens, the fourth lens group consists of a single lens, and the fifth lens group consists of a single lens.

10. A zoom lens comprising:

a first lens group having a positive refractive power;

a second lens group having a negative refractive power;

a third lens group having a positive refractive power;

a fourth lens group having a positive refractive power; and a fifth lens group having a positive refractive power;

wherein the first through fifth lens groups are sequentially arranged from an object side toward an image side; the first lens group, the second lens group, and the third lens group are moved in a direction along an optical axis to change magnification; and the second lens group satisfies $$0.6 \leq \frac{|f_2|}{\sqrt{f_W f_T}} \leq 1.0,$$

where $f_W$ is an entire focal length at a wide-angle end, $f_T$ is an entire focal length at a telephoto end, and $f_2$ is a focal length of the second lens group.

11. The zoom lens of claim 10, wherein the fourth lens group is moved to compensate for movement of a focal position occurring during the magnification change, and the fifth lens group is fixed.

12. The zoom lens of claim 10, wherein the fifth lens group satisfies $$2 \leq \frac{|f_5|}{\sqrt{f_W f_T}} \leq 3,$$

where $f_5$ is a focal length of the fifth lens group.

13. The zoom lens of claim 10, wherein the first lens group consists of a single positive lens.

14. The zoom lens of claim 10, wherein the third lens group satisfies $$0.8 \leq \frac{|f_3|}{\sqrt{f_W f_T}} \leq 1.2,$$

where $f_3$ is a focal length of the third lens group.

15. The zoom lens of claim 10, further comprising a diaphragm between the second lens group and the third lens group, wherein the diaphragm is moved together with the third lens group.

16. The zoom lens of claim 10, wherein a distance between the first lens group and the third lens group is maintained constant.

17. The zoom lens of claim 10, wherein the second lens group comprises a first lens having a positive refractive power, a second lens having a negative refractive power, and a third lens having a positive refractive power, which are sequentially arranged from the object side.

18. The zoom lens of claim 10, wherein the third lens group comprises a first lens having a positive refractive power, a second lens having a positive refractive power, and a third lens having a negative refractive power, which are sequentially arranged from the object side.

19. The zoom lens of claim 10, wherein the fourth lens group consists of a single lens.

20. The zoom lens of claim 10, wherein the fifth lens group consists of a single lens.

21. The zoom lens of claim 10, wherein the fifth lens group comprises a single aspherical lens.

22. The zoom lens of claim 10, wherein the third lens group comprises at least one aspherical lens.

23. The zoom lens of claim 10, wherein during the magnification change, the first and third lens groups are linearly moved and the second lens group is moved forming a curve.

24. A zoom lens comprising:

a first lens group having a positive refractive power;

a second lens group having a negative refractive power;

a third lens group having a positive refractive power;
a fourth lens group having a positive refractive power; and
a fifth lens group having a positive refractive power;
wherein the first through fifth lens groups are sequentially arranged from an object side toward an image side; and to change magnification, the first and third lens groups are linearly moved such that a distance between the first and third lens groups is maintained constant and the second lens group is moved.

25. The zoom lens of claim 24, wherein the zoom lens satisfies $$0.6 \leq \frac{|f_2|}{\sqrt{f_W f_T}} \leq 1.0,$$

where $f_W$ is an entire focal length at a wide-angle end, $f_T$ is an entire focal length at a telephoto end, and $f_2$ is a focal length of the second lens group.

26. The zoom lens of claim 24, wherein the third lens group satisfies $$0.8 \leq \frac{|f_3|}{\sqrt{f_W f_T}} \leq 1.2,$$

where $f_W$ is an entire focal length at a wide-angle end, $f_T$ is an entire focal length at a telephoto end, and $f_3$ is a focal length of the third lens group.

27. The zoom lens of claim 24, wherein the fifth lens group satisfies $$2 \leq \frac{|f_5|}{\sqrt{f_W f_T}} \leq 3,$$

where $f_W$ is an entire focal length at a wide-angle end, $f_T$ is an entire focal length at a telephoto end, and $f_5$ is a focal length of the fifth lens group.

28. The zoom lens of claim 24, wherein the first lens group consists of a single positive lens.

29. A zoom lens comprising:
a first lens group consisting of a single positive lens and having a positive refractive power;
a second lens group having a negative refractive power;
a third lens group having a positive refractive power;
a fourth lens group having a positive refractive power; and
a fifth lens group having a positive refractive power;
wherein the first through fifth lens groups are sequentially arranged from an object side toward an image side, and during magnification change, the first lens group, the second lens group, the third lens group, and the fourth lens group are moved and the fifth lens group is fixed.

30. The zoom lens of claim 29, wherein the fourth lens group compensates for movement of a focal position occurring during the magnification change.

31. The zoom lens of claim 29, wherein the second lens group satisfies $$0.6 \leq \frac{|f_2|}{\sqrt{f_W f_T}} \leq 1.0,$$

where $f_W$ is an entire focal length at a wide-angle end, $f_T$ is an entire focal length at a telephoto end, and $f_2$ is a focal length of the second lens group.

32. The zoom lens of claim 29, wherein the third lens group satisfies $$0.8 \leq \frac{|f_3|}{\sqrt{f_W f_T}} \leq 1.2,$$

where $f_W$ is an entire focal length at a wide-angle end, $f_T$ is an entire focal length at a telephoto end, and $f_3$ is a focal length of the third lens group.

33. The zoom lens of claim 29, wherein the fifth lens group satisfies $$2 \leq \frac{|f_5|}{\sqrt{f_W f_T}} \leq 3,$$

where $f_W$ is an entire focal length at a wide-angle end, $f_T$ is an entire focal length at a telephoto end, and $f_5$ is a focal length of the fifth lens group.

34. The zoom lens of claim 29, further comprising a diaphragm between the second lens group and the third lens group, wherein the diaphragm is moved together with the third lens group.

35. The zoom lens of claim 29, wherein a distance between the first lens group and the third lens group is maintained constant.

36. The zoom lens of claim 29, wherein the fifth lens group comprises a single aspherical lens.

37. The zoom lens of claim 29, wherein the third lens group comprises at least one aspherical lens.

38. The zoom lens of claim 29, wherein the fourth lens group consists of a single lens, and the fifth lens group consists of a single lens.

* * * * *